United States Patent
Taylor

(10) Patent No.: US 7,804,939 B2
(45) Date of Patent: Sep. 28, 2010

(54) METHODS AND SYSTEMS FOR CORRECTING CROSS-CONNECT ASSIGNMENTS

(75) Inventor: Toy T. Taylor, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1323 days.

(21) Appl. No.: 11/267,558

(22) Filed: Nov. 4, 2005

(65) Prior Publication Data

US 2006/0239428 A1 Oct. 26, 2006

Related U.S. Application Data

(60) Provisional application No. 60/673,111, filed on Apr. 20, 2005.

(51) Int. Cl.
*H04M 1/24* (2006.01)
*H04M 3/08* (2006.01)
*H04M 3/22* (2006.01)

(52) U.S. Cl. .................. 379/15.03; 379/9; 379/9.02

(58) Field of Classification Search .............. 379/9, 379/9.02–9.04, 15.03, 201.12; 714/1, 4, 714/48; 709/226; 370/241.1, 254
See application file for complete search history.

(56) References Cited

U.S. PATENT DOCUMENTS

| 5,774,689 A * | 6/1998 | Curtis et al. ................. 703/21 |
| 6,295,540 B1 * | 9/2001 | Sanschagrin et al. ........... 379/9 |
| 7,421,493 B1 * | 9/2008 | Adams ...................... 709/224 |
| 7,440,408 B1 * | 10/2008 | Anderson ................... 370/252 |
| 7,467,193 B2 * | 12/2008 | Cerami et al. ............... 709/223 |
| 2003/0014332 A1 * | 1/2003 | Gramling ..................... 705/28 |
| 2006/0059262 A1 * | 3/2006 | Adkinson et al. ........... 709/225 |

* cited by examiner

*Primary Examiner*—Quoc D Tran
(74) *Attorney, Agent, or Firm*—Parks IP Law LLC; Jennifer P. Medlin, Esq.

(57) ABSTRACT

Methods and systems are configured to provide information associated with a communication network. The information is useful when maintaining data associated with one or more segments that define a communication path in the communication network. Moreover, the information can be used to correct one or more records associated with one or more segments in a record keeping system, such as a Loop Facility Assignment Control System (LFACS).

20 Claims, 7 Drawing Sheets

Fig. 7

```
File  Edit  View  Connection  Transfer  Option Tool  Help command option INQ FASG WC=GTH, EMP=TTT, CA=FPGS, PR=1, PRI=I
wc GTH
   ca FPGS pr 1                                              page 1
ckid NONE lp stat CF 07-29-00 csw: ex Y trm Y                emp TTT
*********************************************************************
TRANSPORT FACILITIES ARE ASSOCIATED WITH THIS LOOP
 f1  ca FPGS   pr 1 stat CF bp/clr 0
 tea TSI 1679-3.4 LAVISTA RD NE type ELECT
    sys: type IDIST no 2305   lt: field stat NREQ   co stat NE
    rla 4202A 1679 LAVISTA RD NE rlc ATLNGAU0289 taper code 420214
    rmk tea: TIME-SLOT INTERCHANGER
 f2  ca EPG5908  pr 954 stat CF
 tea I 900.2 BRIARVISTA WAY NE 1.1 type SAP tec ATLNGAU3289 cq E9
 LOOP MAKEUP EXISTS
    sys: type DISCS no 2508 lt: field stat NREQ
    rla 4202A 1679 LAVISTA RD NE rlc ATLNGAU0239 taper code: 420214
asq bp: n0 22 lt: stat ESQ
next           (M) (P) (Q)           MORE          MORE         MORE
Ready          Running    SGL  APL  NUMFLD  OVR  CAP  NUM  W
```

METHODS AND SYSTEMS FOR CORRECTING CROSS-CONNECT ASSIGNMENTS

RELATED APPLICATIONS

This application claims priority to U.S. Provisional Patent Application Ser. No. 60/673,111, filed on Apr. 20, 2005. The entire contents of the aforementioned provisional application are incorporated herein by reference.

BACKGROUND

The Loop Facility Assignment Control System (LFACS) is used to maintain data on inventory and assignment of loops within a communication system. A "loop" refers to telecommunications facilities, such as cables, poles, terminals, electronic devices, etc. used to get telephone or other services from a central office (CO) to a customer. The CO is typically a structure that contains telecommunications switches and is an origination point of copper and fiber cables used to provide services.

LFACS is a legacy system and can be used to assign loop facilities in real-time during a service activation process. The LFACS can be used to maintain communication topology records associated with the service activation process. The LFACS includes an assignment algorithm used to build a record. Each record may include the physical cable routed from a CO to a distribution terminal and the cable pairs that route to a particular service customer. The LFACS can be used to assign specific cable pairs based on a service order. A typical service record may include many cable pairs traversing one or more distribution terminals.

For example, the LFACS can use an address to determine a distribution terminal associated with the address and any associated wiring limitations. Using this and other information, LFACS works back to a CO, mapping all the distribution terminals and related segments needed to complete the service order. The service order information is stored in a record and provided to a technician. The technician uses the record to implement the communication path from the CO to the panel box associated with the address. A record is maintained which details the service communication path to the subscriber's address. The record is also used in subsequent service requests and during maintenance procedures.

However, it has been observed that loop distributions can be modified over time for various reasons. Sometimes changes are made without reporting the change. Consequently, when LFACS assigns segments for a particular service order, a technician servicing the order may observe that an assigned segment is already in use. The technician may report the problem, and a clerk typically attempts to manually correct the LFACS record. This leads to inefficiencies and additional cost, as well as potentially incorrect LFACS records. Moreover, the clerk may not be able to correct the record (or records), because the LFACS assignment rules and records indicate that certain segments are recorded as being in use. The incorrect records and subsequent correction attempts can result in a domino effect adversely affecting other loops. That is, correcting one incorrect segment can interfere with another segment and one or more LFACS records. Additionally, incorrect LFACS records tend to impede service maintenance in the field.

SUMMARY

Embodiments of the invention include methods and systems configured to provide information associated with a communication network. The information is useful when maintaining data associated with one or more segments that define a communication path in the communication network. Moreover, the information can be used to correct one or more records associated with one or more segments in a record keeping system, such as a Loop Facility Assignment Control System (LFACS).

According to an embodiment, a method of maintaining records associated with a communication network includes determining first and second data sets, and comparing the first and second data sets. The first and second data sets include elements associated with a number of segments, wherein each segment is associated with a communication path in a communication network. The method also operates to determine if the first data set is accurate based on the comparison of the first and second data sets. If the first data set includes inaccurate data, the method operates to correct an inaccuracy by locating first, second, and third elements in the first data set. The first element is associated with a first circuit, the second element is associated with a second circuit, and the third element is a spare. The method replaces the second element with the third element in the first data set, making the second element spare, and replaces the first element with the second element in the first data set to thereby correct the inaccuracy. The methods described herein may be incorporated in a server, system, handheld computing device, computer-readable medium, or a combination thereof.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the invention include methods and systems configured to provide information associated with a communication network. The information is useful when maintaining data associated with one or more segments, which define a communication path in the communication network. Moreover, the information can be used to correct one or more records associated with one or more segments in a record keeping system, such as a Loop Facility Assignment Control System (LFACS).

In the following detailed description, references are made to the accompanying drawings that form a part hereof, and in which are shown by way of illustrations specific embodiments or examples. These embodiments may be combined, other embodiments may be utilized, and changes may be made without departing from the spirit or scope of the present invention. The following detailed description is therefore not to be taken in a limiting sense and the scope of the present invention is defined by the appended claims and equivalents.

Exemplary Operating Environment

Figure 1:
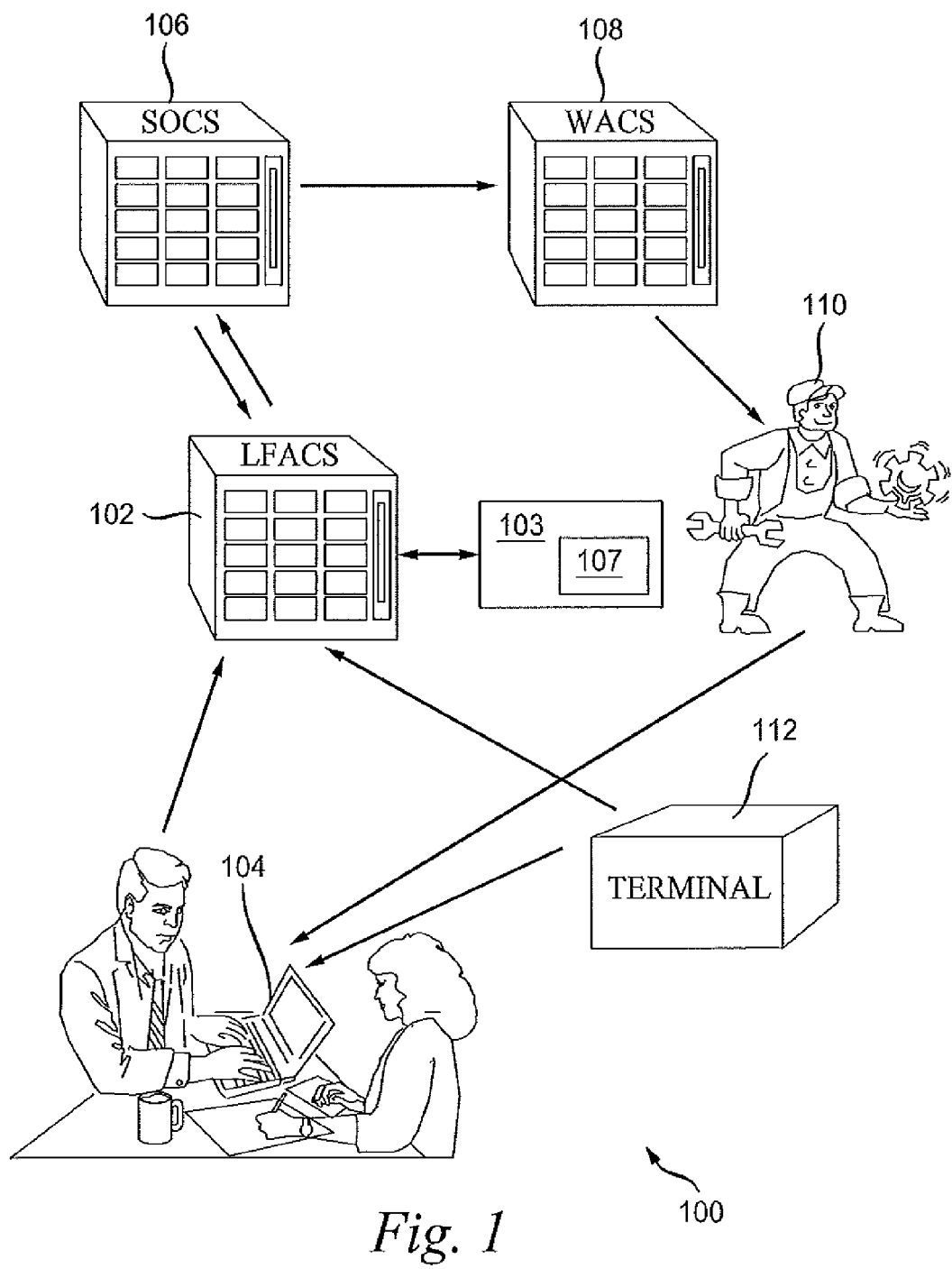
FIG. 1 illustrates an exemplary operating environment.

Referring now to the drawings, in which like numerals represent like elements through the several figures, aspects of the present invention and the exemplary operating environment will be described. FIG. 1 and the following discussion are intended to provide a brief, general description of a suitable operational environment.

FIG. 1 depicts an exemplary operating environment 100 for implementing embodiments of the invention. The exemplary operating environment 100 of FIG. 1 is shown to include a Loop Facility Assignment Control System (LFACS) 102. Personnel using one or more computing devices 104 can input facility inventory information (such as communication networks, distribution paths, segments, terminals, fiber, copper, intelligent devices, etc.) to the LFACS 102. The facility inventory information is typically based on engineering records. The LFACS 102 is in communication with a computing device 103, personnel computing devices 104, and a service order control system (SOCS) 106. The SOCS 106 typically receives service orders from a regional order system (ROS) (not shown). As described further below, according to a preferred embodiment, computing devices 103 and/or 104 can include an application 107 that operates to correct cross-connect assignments in the LFACS 102.

The SOCS 106 provides the service orders to the LFACS 102. Based on a particular service order, the LFACS 102 assigns facilities and retains assigned inventory in the form of records. The LFACS 102 then provides the service order and the facility assignments back to SOCS 106. The SOCS 106 provides the service order and the facility assignments to a Workforce Administration Control System (WACS) 108. The WACS 108 is configured to assign and distribute the service order to one or more technicians 110. As described further below, the operating environment 100 includes a terminal 112 (the operating environment 100 typically includes many such terminals 112) which typically includes multiple inputs and outputs for establishing communication paths to and from central offices, other equipment, and subscribers or customers. Using the service order, the technician 100 (or technicians) go out into the field and build the necessary communication paths to provide a service to the subscriber.

Figure 2:
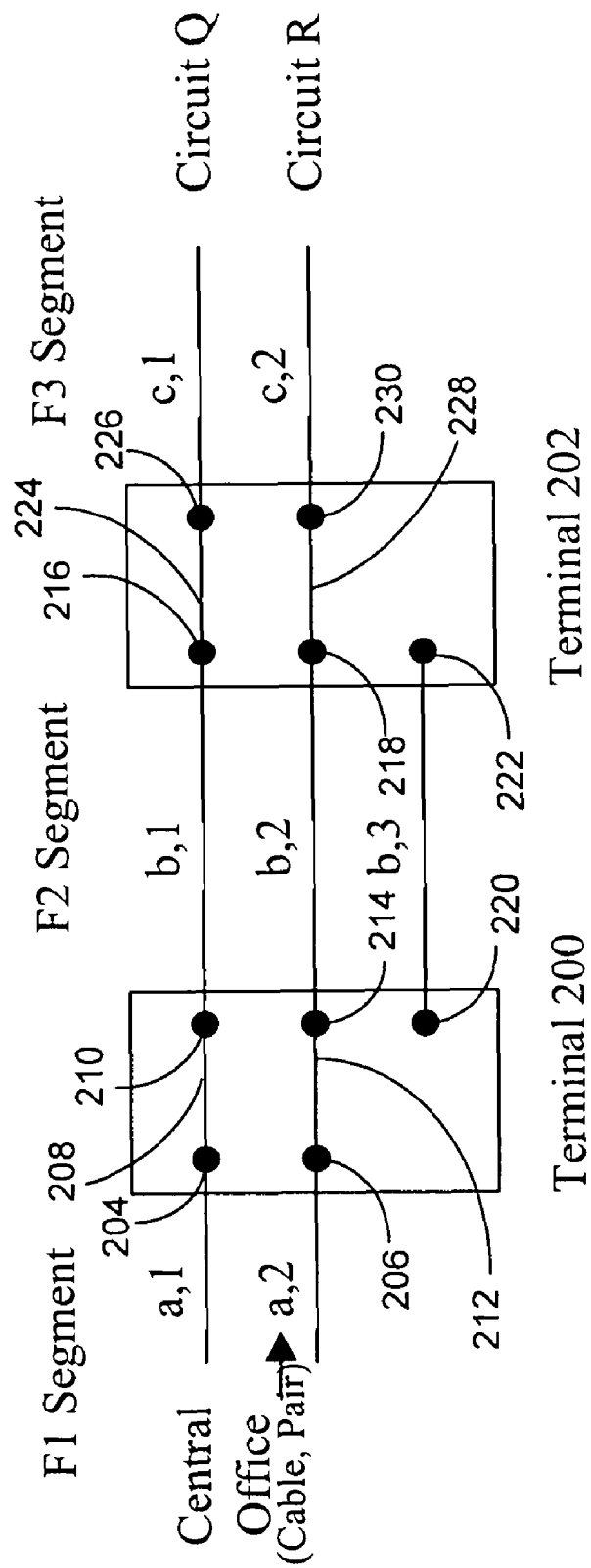
FIG. 2 is a simplified block diagram of an exemplary communication network including an inaccurate communication path associated with a record keeping system.

As an example, and with additional reference to FIG. 2, a technician 110 has received a service order with instructions to provide telephone service to a new subscriber. The particular service to be implemented is not critical to the description herein, and the invention is not intended to be limited by any examples or embodiments described herein. As shown in the simplified block diagram of FIG. 2, the particular service order requires the technician to service two terminals, terminal 200 and terminal 202. The block diagram shown in FIG. 2 has been simplified to allow a description of embodiments of the invention without unnecessary complication.

As described above, the facilities are preferably inventoried in the LFACS 102 as segments where a terminal represents the structure where jumpers called cross-connects join segments. A terminal includes a telecommunications device where copper or fiber cables are connected to metal posts, or electronic device(s) that provide virtual channels. Exemplary terminals include distribution terminals and cross-box terminals. The terminals and cross-connects can be either physical, electronic, or a combination thereof. A segment designates the physical copper or fiber plant or electronic channels that exist between terminations. A cross-connect designates a joining, either physical or electronic, of segments within a terminal. As shown in FIG. 2, terminal 200 includes an input segment F1 and an output segment F2. According to this example, the input segment F1, is in communication with a central office or facility (e.g., switch, router, or other switching/routing devices), and includes two cable pairs (a, 1) and (a, 2). It will be appreciated that each segment can include many such cable pairs and the designations of the pairs can be implemented according to preference.

Cable pair (a, 1) is connected to terminal post 204 and cable pair (a, 2) is connected to terminal post 206. Once connected, the cable pairs (a, 1) and (a, 2) provide communication paths between terminal 200 and the central office. A cross-connect 208 connects terminal post 204 to terminal post 210 of terminal 200. A cross-connect 212 connects terminal post 206 to terminal post 214 of terminal 200. Segment F2 is in communication with terminal 202 and terminal 200 and includes cable pairs (b, 1), (b, 2), and (b, 3). Cable pair (b, 1) is connected to terminal post 210 and terminal post 216 of terminal 202. Cable pair (b, 2) is connected to terminal post 214 and terminal post 218 of terminal 202. Cable pair (b, 3) is connected to terminal post 220 of terminal 200 and terminal post 222 of terminal 202. A cross-connect 224 connects terminal post 216 to terminal post 226 of terminal 202. A cross-connect 228 connects terminal post 218 to terminal post 230 of terminal 202. Segment F3 is in communication with terminal 202 and includes cable pairs (c, 1) and (c, 2). It will be appreciated that operating architecture 100 can include numerous terminals, segments, and cable pairs.

The LFACS 102 includes a record of the communication paths depicted in the block diagram of FIG. 2. The technician 110 uses the dispatched record to establish the communication paths and thereby implement the service order. As described above, in some instances, when the technician 110 begins installation of the service and physically inspects a terminal, it turns out that the LFACS record does not correspond to the actual physical implementation. That is, a terminal post or cable pair may already be in use, servicing another subscriber. The technician cannot just rearrange the connections to comport with the new service order, because other segments may be adversely affected due to the incorrect record(s).

It is also possible to determine the topography of a particular terminal (connected terminal posts and/or cable pairs) using a Data Validation and Reporting System (DAVAR) analysis, an Intelligent Network Element (INE) (The INE may be the terminal and have the capability to either report cross-connect when queried or self report any changes), or other reporting means. INEs may include, but are not limited to, multiplexers (Synchronous Optical Network (SONET), Synchronous Digital Hierarchy (SDH), or Digital Subscriber Line Access Multiplexer (DSLAM)), or Next Generation Digital Loop Carriers.

In some embodiments, the LFACS 102 or another computing system can be configured to pull information from an INE or the information can be pushed from the INE to another system. For example, a computing device, such as computing device 103 can periodically or randomly pull information from the INE directly or remotely. Using the information, the application described below can be used to correct cross-connect assignment conflicts in one or more LFACS records. A software application may perform any translations needed to correspond to the LFACS data structure. Translations may (e.g., INE terminal) or may not (e.g., copper/fiber terminal) be necessary.

Table 1 below is an example illustrating a discrepancy between LFACS records and the actual terminal topology.

TABLE 1

| Circuit | LFACS Records | | | Actual from Field | | |
| --- | --- | --- | --- | --- | --- | --- |
|  | F1 | F2 | F3 | F1 | F2 | F3 |
| Q (Target) | a, 1 | b, 1 | c, 1 | a, 1 | b, 2 | c, 1 |
| R (Secondary) | a, 2 | b, 2 | c, 2 | a, 2 | b, 1 | c, 2 |
| Spare |  | b, 3 |  |  | b, 3 |  |

The "Actual from Field" data is based on the actual physical connections at terminals 200 and 202. As described above, the actual field data can be based on a technician's inspection, INE data, etc. As shown in Table 1 and with continuing reference to FIG. 2, cable pairs (a, 1) and (a, 2) are included in the F1 segment, cable pairs (b, 2), (b, 1), and (b, 3) are included in the F2 segment, and cable pairs (c, 1) and (c, 2) are included in the F3 segment. Cable pairs (a, 1), (b, 2), and (c, 1) are part of circuit Q. Cable pairs (a, 2), (b, 1), and (c, 2) are part of circuit R. Cable pair (b, 3) is a spare cable pair. That is, spare cable pair (b, 3) is not a part of any circuit. A spare can be determined by physical inspection or by polling one or more INEs associated with the terminal and comparing the polled information to existing LFACS records. The application 107 can be implemented to automatically compare the actual and LFACS data and provide a result as to erroneous data in the LFACS record(s).

The "LFACS Records" data reflects the discrepancy between the LFACS record and the actual physical connections at terminals 200 and 202. As described above, there are a number of factors that may cause the LFACS records not to correspond with the actual physical connections in the field. As shown in Table 1, the LFACS records show that cable pairs (a, 1) and (a, 2) are included in the F1 segment, cable pairs (b, 1), (b, 2), and (b, 3) are included in the F2 segment, and cable pairs (c, 1) and (c, 2) are included in the F3 segment. However, as compared with the actual field data, the LFACS records reflect that cable pairs (a, 1), (b, 1), and (c, 1) are part of circuit Q and cable pairs (a, 2), (b, 2), and (c, 2) are part of circuit R. That is, the correct pairs to be cross-connected are already cross-connected to other pairs as part of a different circuit. The LFACS records correctly show that cable pair (b, 3) is a spare cable pair and not a part of any circuit.

Figure 3:
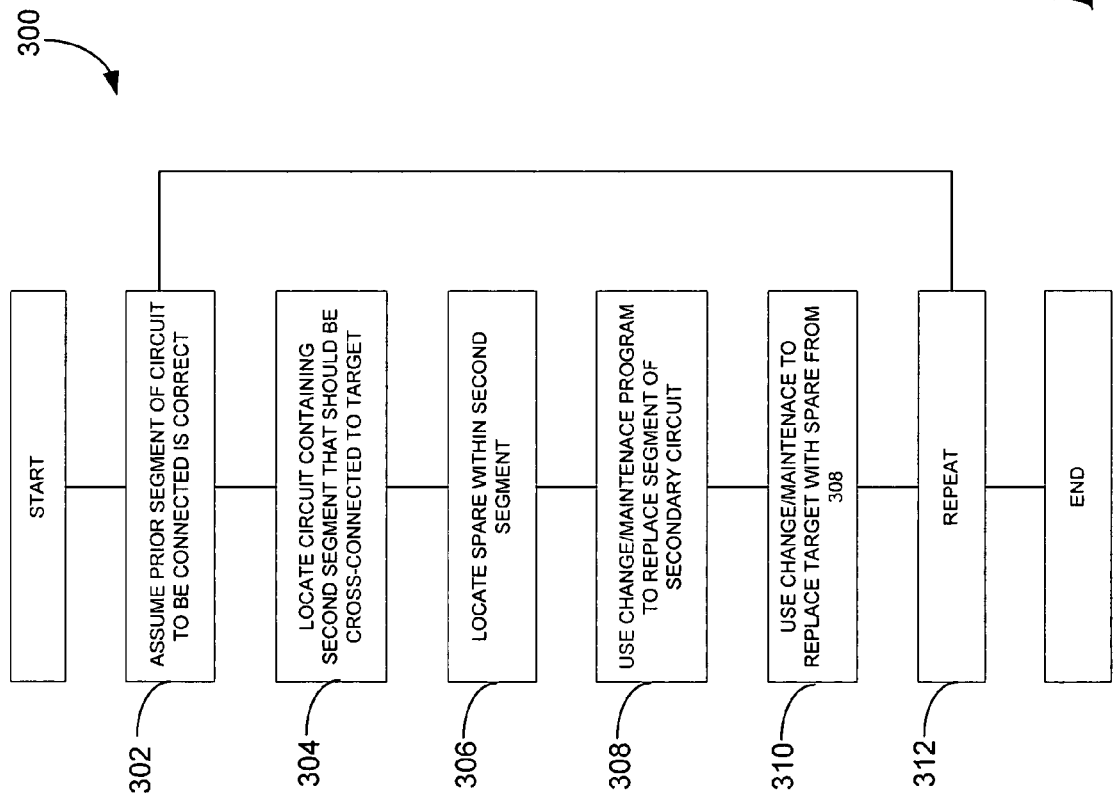
FIG. 3 depicts a flow diagram according to an embodiment.

According to an embodiment and referring to FIG. 3, a flow 300 illustrates using the application 107 to correct one or more LFACS records which conflict with actual field architectures. The application 107 can be resident on computing device 103, on the LFACS 102, or on some other computing device. Preferably, the application operates in conjunction with the LFACS 102 to correct LFACS record discrepancies. As described below, the application 107 operates to correct cross-connect assignment conflicts in one or more LFACS records by making a desired facility segment "spare".

At 302, the application 107 assumes that the F1 segment of the circuit to be corrected is correct. The application 107 considers this the target circuit for correction. At 304, the application 107 operates to locate the circuit containing the F2 segment that should be cross-connected to the target F1 segment. The application 107 considers this the secondary circuit. At 306, the application 107 operates to locate a spare facility cable pair within the next segment (F2) at the terminal 200. A spare cable pair should be spare in both the LFACS record(s) and the field, although this is not necessary.

At 308, the application 107 utilizes an LFACS change/maintenance program, such as "chg.loop", "mtc.loop", or "emtc.loop", to replace the F2 segment of the secondary circuit with the spare F2 located in 306 above. The "chg.loop", "mtc.loop", and "emtc.loop refer to LFACS programs which operate to change or maintenance loop circuit assignments respectively. These change/maintenance programs may be executed from LFACS 102, a computing device that also hosts application 107, or from a remote terminal. The change/maintenance programs can also be programmed as separate modules accessible, directly or remotely, by the application 107. After 308, the original secondary circuit F2 segment is now a spare. At 310, the application 107 again utilizes one of the change/maintenance programs to replace the F2 segment of the target circuit with the F2 segment made spare by 308. The original target circuit F2 segment is now spare. At 312, the application 107 can operate to repeat 302-310 for other circuits requiring corrections. It will be appreciated that the flow 300 can be used to make corrections to any number of segments in various configurations.

An example will help to provide further understanding when using application 107 to correct cross-connect assignment conflicts in one or more LFACS records. Using the information from observations in the field and the existing LFACS records, Table 1 above is created. The actual field data is populated in Table 1 to reflect cross-connects needing corrections that have segments that are in conflict. In the example of Table 1, cable pair (b, 2) is actually part of circuit Q but is shown in the LFACS record as part of circuit R. The application 107 extracts data from one or more sources and uses a script to build or populate the respective table. Table 1 exists after executing 302-306 above, and provides the target circuit, secondary circuit, and a spare F2 facility. It is important to note that, as shown in Table 1, circuit Q cannot be corrected by merely replacing cable pair (b, 1) of the F2 segment with cable pair (b, 2) since the LFACS assignment rules would not allow such a replacement.

Figure 4:
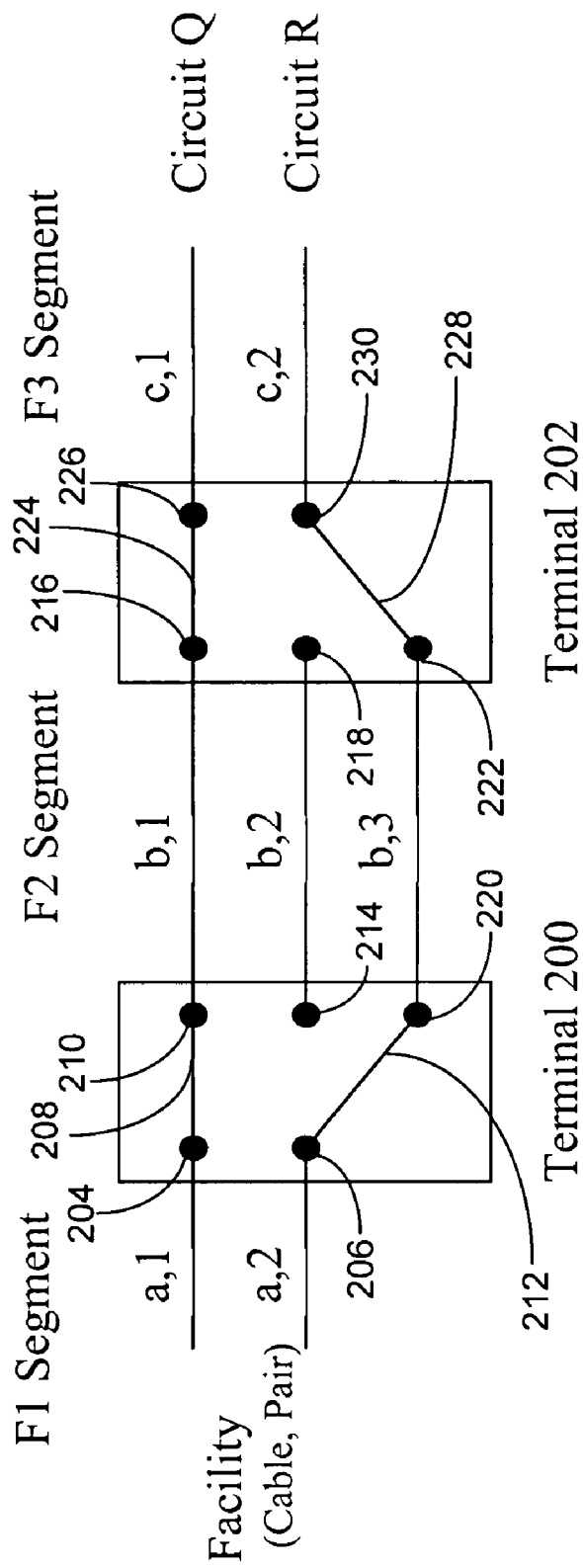
FIGS. 4-6 are simplified block diagrams of the exemplary communication network of FIG. 2 which depict a method of correcting the inaccurate communication paths according to an embodiment; and, FIG. 7 is a screenshot of an interface depicting information associated with a communication network according to an embodiment.

Referring now to FIG. 4 and Table 2 below, the data in Table 2 reflects the result upon executing 308 above. FIG. 4 is a representation of the physical connections based on the data shown in Table 2. As shown in FIG. 4 and Table 2, cable pair (b, 2) in circuit R has been replaced with cable pair (b, 3). Cross-connect 212 now connects cable pair (a, 2) with cable pair (b, 3) in the LFACS record(s). Likewise, cross-connect 228 now connects cable pair (b, 3) with cable pair (c, 2) in the LFACS record(s). Cable pair (b, 2) is now spare in the LFACS record(s).

TABLE 2

| Circuit | LFACS Records | | | Actual from Field | | |
| --- | --- | --- | --- | --- | --- | --- |
|  | F1 | F2 | F3 | F1 | F2 | F3 |
| Q | a, 1 | b, 1 | c, 1 | a, 1 | b, 2 | c, 1 |
| R | a, 2 | b, 3 | c, 2 | a, 2 | b, 1 | c, 2 |
| Spare |  | b, 2 |  |  | b, 3 |  |

Figure 5:
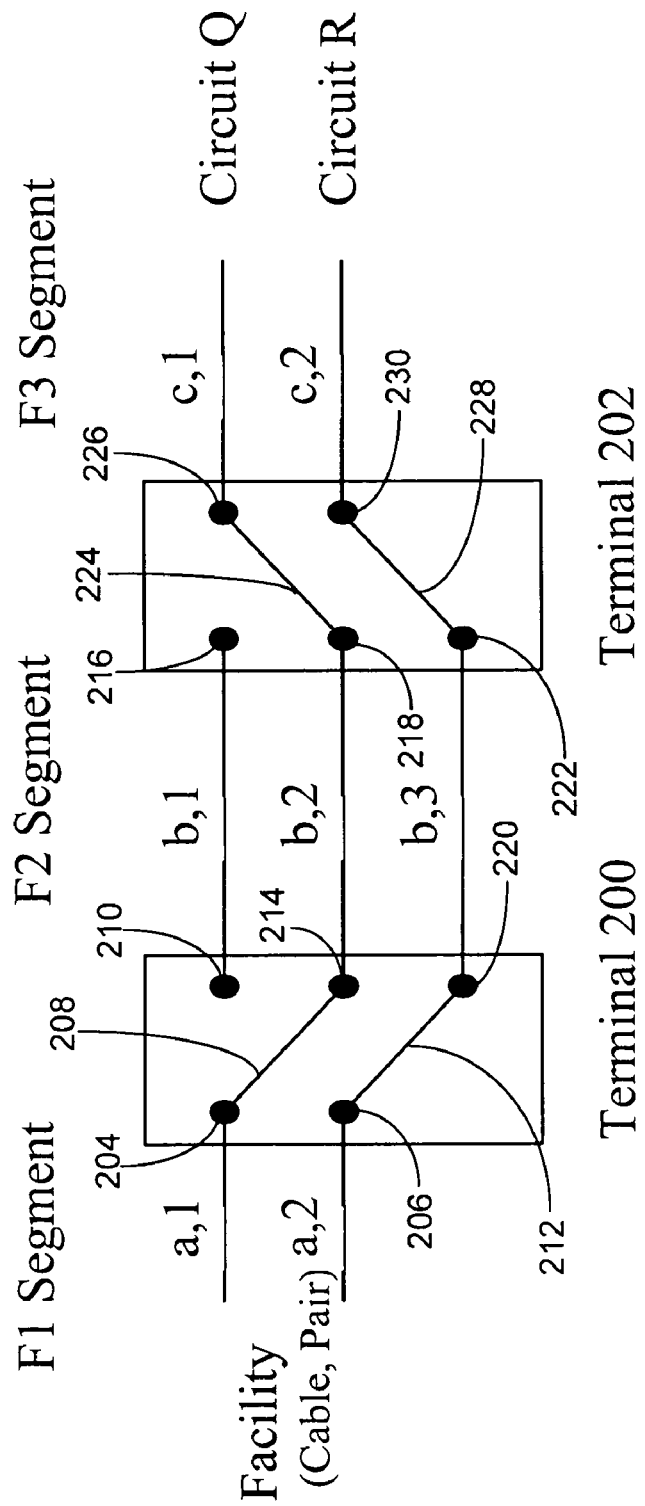

Referring now to FIG. 5 and Table 3 below, the data in Table 3 reflects the result upon executing 310 above. FIG. 5 is a representation of the physical connections based on the data shown in Table 3. As shown in FIG. 5 and Table 3, cable pair (b, 1) in circuit Q has been replaced with cable pair (b, 2). Cross-connect 208 now connects cable pair (a, 1) with cable pair (b, 2) in the LFACS record(s). Likewise, cross-connect 224 now connects cable pair (b, 2) with cable pair (c, 1) in the LFACS record(s). Cable pair (b, 1) is now spare in the LFACS record(s). Circuit Q now matches the actual field conditions.

TABLE 3

| | LFACS Records | | | Actual from Field | | |
|---|---|---|---|---|---|---|
| Circuit | F1 | F2 | F3 | F1 | F2 | F3 |
| Q | a, 1 | b, 2 | c, 1 | a, 1 | b, 2 | c, 1 |
| R | a, 2 | b, 3 | c, 2 | a, 2 | b, 1 | c, 2 |
| Spare | | b, 1 | | | b, 3 | |

Figure 6:
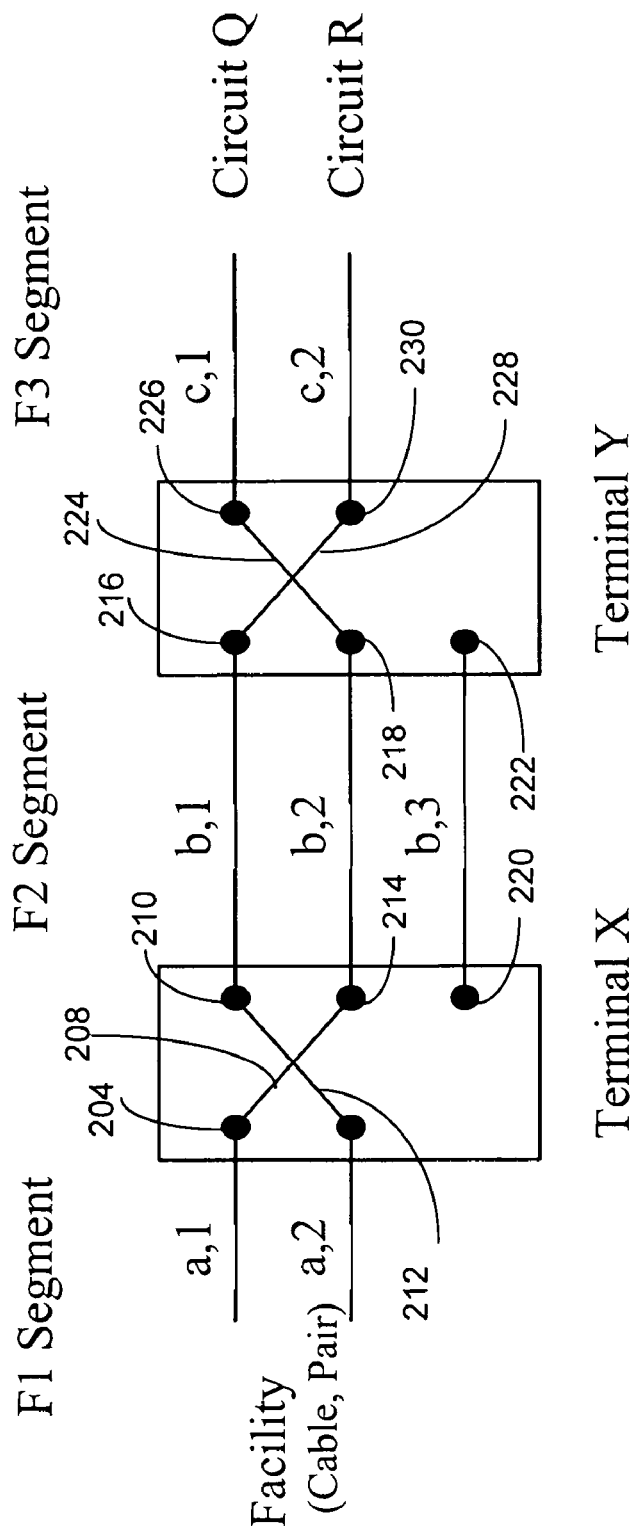

Referring now to FIG. 6 and Table 4 below, the data in Table 4 reflects the result after executing one of the LFACS change/maintenance programs, such as "chg.loop", "mtc.loop", or "emtc.loop", which operates to correct the inaccuracy since there are no remaining conflicts to correct. FIG. 6 is a representation of the physical connections based on the data shown in Table 4 after using one of the change/maintenance programs. As shown in FIG. 6 and Table 4, cable pair (b, 3) in circuit R has been replaced with cable pair (b, 1). That is, cross-connect 212 now connects cable pair (a, 2) with cable pair (b, 1) in the LFACS record(s). Likewise, cross-connect 228 now connects cable pair (b, 1) with cable pair (c, 2) in the LFACS record(s). Cable pair (b, 3) is again spare in the LFACS record(s). As shown in Table 4, the LFACS record(s) reflect that both circuit Q and circuit R now match the actual field conditions.

TABLE 4

| | LFACS Records | | | Actual from Field | | |
|---|---|---|---|---|---|---|
| Circuit | F1 | F2 | F3 | F1 | F2 | F3 |
| Q | a, 1 | b, 2 | c, 1 | a, 1 | b, 2 | c, 1 |
| R | a, 2 | b, 1 | c, 2 | a, 2 | b, 1 | c, 2 |
| Spare | | b, 3 | | | b, 3 | |

FIG. 7 is a screenshot of an LFACS assignment record that depicts an f1 segment 702 and an f2 segment 704. The interface 700 includes a number of interface constructs, one of which being button 706 having an "X" on its face. Button 706 can be used to start and execute flow 300. It will be appreciated that button 706 is but one mechanism for executing flow 300 and other interface constructs can be used as well.

The flow 300 can work on any segment and it is preferred to assume that at least one associated segment is correct. In some embodiments, the flow 300 is used in conjunction with the assumption that the F1 segment is correct. This is typically a good assumption considering that the F1 segment appears in the CO and often requires switching or other routing. That is, the flow 300 may be used by beginning at the CO and branching out to check all segments that include the segment or segments of concern. For corrections involving several segments of a circuit, it is preferred to correct each segment independently of other segments and corrections should sequence from the closest CO segment (typically F1) outwards. The above process will work for any quantity of circuits needing cross-connect corrections.

It will be appreciated that while certain embodiments have been described herein, the invention is not intended to be limited by any specific example or embodiment. Moreover, the term "computer readable media" as used herein includes both storage media and communication media. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

It should be appreciated that various embodiments can be implemented as a sequence of acts and implemented using software and hardware resources. The procedure described above can be automated and executed from one or more computer systems to provide the various acts and results described above. Accordingly, logical operations may be implemented in software, firmware, special purpose digital logic, and any combination thereof. Moreover, the logical operations described herein can be rearranged to flow in many other implementations and combinations.

It should also be appreciated that the various embodiments both claimed and described may be used in other network management systems that include cross-connects or assignments made between sequential segments. Examples of such systems include Trunk Integrated Record Keeping Systems (TIRKS) and switches.

Although various exemplary embodiments have been described, those of ordinary skill in the art will understand that many modifications can be made thereto. Accordingly, it is not intended that the scope of the invention in any way be limited by the above description and other embodiments of the invention will be apparent to those skilled in the art from consideration of the specification and practice of the invention disclosed herein.

What is claimed is:

1. A method of maintaining records associated with a communication network, the method comprising:
    determining a first data set from the records associated with the communication network,
    determining a second data set by inspection within the communication network,
    comparing the first and second data sets, the first and second data sets including elements associated with a number of segments, wherein each segment is associated with a communication path,
    determining if the first data set is accurate based on the comparison, and
    if the first data set includes inaccurate data, correcting an inaccuracy comprising:
        locating a first element in the first data set, the first element associated with a first circuit,
        locating a second element in the first data set, the second element associated with a second circuit,
        locating a third element in the first data set, the third element being spare,
        replacing the second element with the third element in the first data set, making the second element spare, and
        replacing the first element with the second element in the first data set to thereby correct the inaccuracy.

2. The method of claim 1, further comprising correcting additional inaccuracies iteratively.

3. The method of claim 1, further comprising correcting each incorrect segment independently of other segments.

4. The method of claim 3, further comprising correcting each incorrect segment beginning with a segment closest to a central office.

5. The method of claim 1, further comprising maintaining one or more records of a Loop Facility Assignment Control System (LFACS).

6. The method of claim 1, further comprising determining the second set of data based on field observations.

7. The method of claim 1, further comprising determining the second set of data based on information associated with an intelligent network element.

8. A computer-readable medium having computer-executable instructions which when executed by a computer perform a method of maintaining records associated with a communication service, the method comprising:
   determining a first record from the records associated with the communication network,
   determining a second record by inspection within the communication network,
   comparing the first and second records, the first and second records including data associated with a number of segments, each segment associated with a communication path,
   determining if the first record is correct based on the comparison, and
   if the first record includes an inaccuracy, correcting the inaccuracy comprising:
      locating a first cable pair in the first record, the first cable pair associated with a first circuit,
      locating a second cable pair in the first record, the second cable pair associated with a second circuit,
      locating a third cable pair in the first record, the third cable pair being spare,
      replacing the second cable pair with the third cable pair in the first record, making the second cable pair spare, and
      replacing the first cable pair with the second cable pair in the first record to thereby correct the inaccuracy.

9. The computer-readable medium of claim 8, the method further comprising correcting additional inaccuracies iteratively.

10. The computer-readable medium of claim 8, the method further comprising correcting each incorrect segment independently of other segments.

11. The computer-readable medium of claim 8, the method further comprising correcting each incorrect segment beginning with a segment associated with a service providing location.

12. The computer-readable medium of claim 8, the method further comprising maintaining one or more records of a Loop Facility Assignment Control System (LFACS).

13. The computer-readable medium of claim 8, the method further comprising determining the data of the second record based on field observations.

14. The computer-readable medium of claim 13, the method further comprising determining the data of the second record based on information associated with an intelligent network element.

15. A system for maintaining records associated with a communication service, the system comprising:
   means for determining a first data set from the records associated with the communication network,
   means for determining a second data set by inspection within the communication network,
   means for comparing the first and second data sets, the first and second data sets including data associated with a number of segments, each segment being associated with a communication path,
   means for determining if the first data set is correct based on the comparison, and
   if the first data set includes an inaccuracy, means for correcting the inaccuracy which comprises:
      means for locating a first element in the first data set, the first element associated with a first circuit,
      means for locating a second element in the first data set, the second element associated with a second circuit,
      means for locating a third element in the first data set, the third element being spare,
      means for replacing the second element with the third element in the first data set, making the second element spare, and
      means for replacing the first element with the second element in the first data set to thereby correct the inaccuracy.

16. The system of claim 15, further comprising means for correcting each incorrect segment independently of other segments.

17. The system of claim 15, further comprising means for maintaining one or more records of a Loop Facility Assignment Control System (LFACS).

18. The system of claim 15, further comprising means for determining the second set of data based on field observations.

19. The system of claim 18, further comprising means for determining the second set of data based on information associated with an intelligent network element.

20. The system of claim 15, further comprising means for correcting a segment of a communication path in a communication network record keeping system.

* * * * *